(12) United States Patent
Meyer et al.

(10) Patent No.: US 12,523,869 B2
(45) Date of Patent: Jan. 13, 2026

(54) DEVICE AND METHOD FOR DETERMINING A PUPIL POSITION

(71) Applicant: Robert Bosch GmbH, Stuttgart (DE)

(72) Inventors: Johannes Meyer, Haseluenne (DE); Thomas Alexander Schlebusch, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 14 days.

(21) Appl. No.: 18/694,033

(22) PCT Filed: Mar. 2, 2023

(86) PCT No.: PCT/EP2023/055292
§ 371 (c)(1),
(2) Date: Mar. 21, 2024

(87) PCT Pub. No.: WO2023/202814
PCT Pub. Date: Oct. 26, 2023

(65) Prior Publication Data
US 2025/0147306 A1   May 8, 2025

(30) Foreign Application Priority Data
Apr. 20, 2022 (DE) ...................... 10 2022 203 850.9

(51) Int. Cl.
*G02B 27/00* (2006.01)
*G02B 27/01* (2006.01)

(52) U.S. Cl.
CPC ....... *G02B 27/0093* (2013.01); *G02B 27/017* (2013.01); *G02B 2027/0178* (2013.01)

(58) Field of Classification Search
CPC .............. G02B 27/0093; G02B 27/017; G02B 2027/0178; G02B 2027/0187;
(Continued)

(56) References Cited

U.S. PATENT DOCUMENTS 10,264,964 B1   4/2019  Berme et al.
2006/0161141 A1  7/2006  Chernyak
(Continued)

FOREIGN PATENT DOCUMENTS

DE   102018214637 A1   3/2020
EP      3963355 A1    3/2022
WO    2020182591 A1    9/2020

OTHER PUBLICATIONS

International Search Report for PCT/EP2023/055292, Issued May 12, 2023.
(Continued)

*Primary Examiner* — Nelson M Rosario
(74) *Attorney, Agent, or Firm* — NORTON ROSE FULBRIGHT US LLP

(57) ABSTRACT

An optical device for determining a pupil position of an eye. The optical device includes a laser, first and second photodetectors, a beam deflection device, and a control unit. The optical device guides light generated by the laser at least partially as illumination light via an illumination beam path to the beam deflection device and illuminates illumination points on the eye/eye environment using the illumination light, during the illumination of a first portion of the illumination points, measures using the first photodetector a laser power of the laser when illuminating the illumination points and/or detects using the first photodetector illumination light reflected at a boundary surface of the eye/eye environment and entering the illumination beam path via the beam deflection device, and, during the illumination of a second portion of the illumination points, detects illumination light scattered on the eye/eye environment using the second photodetector.

12 Claims, 3 Drawing Sheets

(58) Field of Classification Search
CPC ............ B60W 60/00; B60W 2420/20; B60W 2420/24; B60W 2420/40; B60W 2420/50; B60W 2420/506; G01S 17/10; G01S 17/36; G01S 17/86; G01S 17/894; G01S 17/931; G01S 7/4811; G01S 7/4815; G01S 7/4816; G01S 7/4817; G01S 7/484; G01S 7/4863; G01S 7/4865; G01S 7/4914; G01S 7/497; H04N 25/773; H05B 47/105; H05B 47/11; H05B 47/16; H10F 39/182; H10F 39/184; H10F 39/191

See application file for complete search history.

(56) References Cited

U.S. PATENT DOCUMENTS

| | | |
|---|---|---|
| 2015/0000995 A1 | 1/2015 | Konchan et al. |
| 2017/0115483 A1 | 4/2017 | Aleem et al. |
| 2020/0284883 A1* | 9/2020 | Ferreira ................ G01S 7/4815 |
| 2021/0271320 A1 | 9/2021 | Fiess et al. |
| 2022/0012871 A1* | 1/2022 | Kim ...................... G02B 27/286 |
| 2023/0204731 A1* | 6/2023 | Park ....................... G01S 17/42 356/5.01 |

OTHER PUBLICATIONS

Meyer et al., "A Novel Camera-Free Eye Tracking Sensor for Augmented Reality Based on Laser Scanning," IEEE Sensors Journal, IEEE, vol. 20, No. 24, 2020, pp. 15204-5212.

* cited by examiner

DEVICE AND METHOD FOR DETERMINING A PUPIL POSITION

FIELD

The present invention relates to an optical device and to a method for determining a pupil position. The present invention also relates to smart glasses based thereon.

BACKGROUND INFORMATION

In the related art, various approaches are described for determining the position of an eye, a pupil and a gaze vector by optical means. For example, cameras and optical sensors are used, possibly in combination with image-processing software. One application for such methods is the use of eye tracking in smart glasses in order to monitor the eye movements of the user of such smart glasses. A major problem when using optical systems for the determination of eye position, pupil position and/or gaze vector is the movement of a user's head relative to the optical system used by the user. One example is the use of eye tracking in smart glasses. Unintentional slippage of the smart glasses can lead to severe disruptions in eye tracking. For this reason, approaches are described in the related art to determine and compensate for such slippage. For example, U.S. Pat. No. 10,264,964 B1 describes the detection and correction of any slippage of smart glasses using video cameras and U.S. Patent Application No. US 2015/0995 A1 describes the use of a motion sensor.

SUMMARY

According to the present invention, an optical device for determining a pupil position, a method for determining a pupil position and smart glasses having an optical device according to the present invention are provided. Advantageous embodiments of the present invention are disclosed herein.

According to a first aspect of the present invention, an optical device for determining a pupil position of an eye with a retina is proposed, wherein the device comprises a laser, a first photodetector, a second photodetector, an adjustable beam deflection device and a control unit for controlling the adjustable beam deflection device. The control unit can comprise digital components and/or analog components, for example a computer, a microprocessor, an ASIC (application-specific integrated circuit) and/or an FPGA (field-programmable gate array). For the purposes of the present invention, a pupil position is understood to mean a spatial position of a pupil of an eye. In particular, the pupil position can be a relative position of the pupil in relation to an eye environment. Within the framework of the present invention, an eye environment of an eye is a region of the head associated with the eye and can comprise any elements of the head of which the position is not dependent on a movement of the eye, for example skin, tissue and/or hair of the head. The device according to the present invention and also the method according to the present invention are not limited to determining a pupil position in a human, but can also be used in animals.

Here, the optical device is designed to guide light generated by the laser at least partially as illumination light via an illumination beam path to the beam deflection device and to illuminate a plurality of illumination points on the eye and an eye environment of the eye by the illumination light by means of adjusting the beam deflection device by the control unit. Thus, the eye and the eye environment are scanned using a beam deflection device. The beam deflection device can be designed in such a way that it can move the illumination light in one or preferably two spatial directions. Both a pulse laser and a continuous wave laser (CW laser) can be used as a laser. The illumination points can be positioned as close together as required, i.e., they can also form a continuous line. This can be the case, for example, with a correspondingly high-frequency pulsed laser or a CW laser as the laser used.

Furthermore, the optical device is designed to measure a laser power of the laser by means of the first photodetector during the illumination of at least a first portion of the illumination points, for example the illumination points located on the eye or all illumination points. No absolute values of the laser power need to be determined for this: Advantageously, differences in the laser power between different illumination points are detected, i.e., power changes when the illumination changes from a first to a second illumination point. The device is thus advantageously configured to ascertain a change in the laser power during a change from a first illumination point to a second illumination point by evaluating the electrical output signals from the first photodetector.

By measuring the laser power of the laser, it is possible to determine in particular whether the illumination light of an illumination point has been reflected at the retina of the eye (at a substantially perpendicular incidence): If illumination light is reflected at a boundary surface of the eye, for example the retina of the eye, with substantially perpendicular incidence of light and then travels in the opposite direction to the direction of illumination (the direction from which the illumination is effected) via the beam deflection device and the illumination beam path (the beam path used for illumination) to the laser used for illumination and there into its laser resonator, this reflected light interferes with the light generated in the laser. This typically results in changes in the amplitude and frequency of the emitted laser light. Thus, the occurrence of such interference can be detected by changes in the laser power. Such a measurement method is known as laser feedback interferometry or self-mixing interferometry. In a variant of the device according to the present invention, the first photodetector, which measures an intensity of the light generated by the laser and thus the laser power, is used for this purpose.

Since the retina reflects light, in particular infrared light, particularly well (compared to other possibly illuminated boundary surfaces of the eye and the eye environment), such illumination points can be identified with high certainty, with which the light has been reflected from the retina back into the illumination beam path. The current position of the pupil of the eye can be derived from this information. Alternatively or additionally, the optical device can also be designed such that, when illuminating at least the first portion of the illumination points on the eye or the eye environment (depending on the position of the particular illumination point), reflected illumination light entering the illumination beam path via the beam deflection device is detected directly by means of the first photodetector. Since the retina has a certain optical roughness, speckle patterns typically occur when illuminated with laser light, and light is therefore not reflected back into the illumination beam path from every point of the illuminated retina. However, the appearance of such a pattern does not interfere with the approach according to the present invention; on the contrary, it can even help to identify the position of the pupil. In addition, the device is designed such that during the illumination of at least a second portion of the illumination points, for example the illumination points on the eye environment or all illumination points, scattered illumination light can be detected on the eye (illumination point on the eye) or on the eye environment (illumination point on the eye environment) by means of the second photodetector.

According to an example embodiment of the present invention, the laser serving as the light source can be an infrared laser, preferably for light with a wavelength in the range from 800 nm to 1050 nm, particularly preferably from 850 nm or 940 nm, which is preferably designed as a laser diode, for example an infrared laser diode and/or a surface emitter (VCSEL, vertical-cavity surface-emitting laser). Lasers and laser diodes emitting in the infrared are advantageous for implementing the present invention, since the retina reflects particularly well in the infrared. The first photodetector and/or the second photodetector can, for example, be a photodiode, a CMOS sensor (CMOS: complementary metal-oxide-semiconductor) and/or a CCD sensor (CCD: charge-coupled device). It is particularly advantageous if, in the case of a surface emitter used as a light source, it has a monitor diode, for example a longitudinally integrated monitor diode, which is integrated into the rear mirror of the surface emitter. In this case, the integrated monitor diode can be identical to the first photodetector. Furthermore, the adjustable beam deflection device can comprise one or more mirrors, in particular a micromirror actuator and/or a galvanometer scanner and/or a resonant scanner (a scanning mirror operated at a resonant frequency).

An optical device according to an example embodiment of the present invention can also comprise at least one further optical element, for example a mirror and/or a prism and/or an HOE (holographic optical element), which is designed to deflect the illumination light again after it has passed through the beam deflection device. This further optical element can be designed in such a way that the illumination light coming from the beam deflection device is deflected in such a way that the eye and the eye environment can be scanned as desired by means of the beam deflection device, i.e., the desired positions of illumination points can be reached, for example. It is therefore possible that the further optical element is a curved mirror or a curved HOE that is adjusted to the shape of the eye and its optical properties in such a way that illumination light is reflected at the retina for the desired illumination points and enters the illumination beam path. The additional optical element thus allows an optimization of the optical device to improve the detection quality and also to place the beam deflection device more independently of the position of the eye and the eye environment, which enables a freer design of the optical device. In particular, when using an optical device according to the present invention in smart glasses, it is possible that such a further optical element is part of a typically curved eyeglass lens of the smart glasses or of a corrective lens for such smart glasses and/or is embedded in an eyeglass lens or a corrective lens.

Furthermore, according to an example embodiment of the present invention, it is advantageous if the optical device comprises an evaluation unit, which is designed to process and evaluate electrical output signals (hereinafter: detector signals or only signals) of the first photodetector and the second photodetector (i.e., to carry out a signal evaluation) and to determine a pupil position and/or a gaze vector from the signals. Here, the evaluation unit can form a unit with the control unit or be identical thereto. The term signal evaluation within the meaning of the present invention is to be understood to mean all types of analog and digital signal processing and evaluation of the signals. For example, a signal evaluation of a photodetector can comprise signal amplification, digitization, filtering and/or data fusion, but also steps to generate data, information and other signals derived from the data obtained in this way. The evaluation unit can comprise digital components and/or analog components. For example, the evaluation unit can comprise one or more amplifiers, bandpass filters, A/D converters and/or a computing unit such as a computer, a microprocessor, an ASIC and/or an FPGA. In particular, the evaluation unit can comprise a multiplexer, which can be used to switch between the signals from the first photodetector and the signals from the second photodetector for evaluating the signals. The evaluation unit can also comprise an image processing device, for example in the form of a computer, which is configured to generate a first image from the possibly pre-processed signals from the first photodetector and a second image from the signals from the second photodetector. Based on these images, a data fusion can be carried out to determine a pupil position and, in particular, a gaze vector. In contrast to many other correlative methods from the related art, no coordinate transformation on the basis of matching image features between the images generated from the signals from the two photodetectors needs to be determined for this, since both images are built on the same illumination points.

Furthermore, according to an example embodiment of the present invention, it is particularly advantageous if the first photodetector is arranged in such a way that a portion of the light generated by the laser is detected by the first photodetector. Such a design of the device according to the present invention enables laser feedback interferometry and thus to detect fluctuations in the power of the laser caused by illumination light entering a resonator of the laser, which has been reflected back from the retina of the eye into the illumination beam path, for example. In the case of the second photodetector, it is also particularly advantageous to position it in such a way that, for each illumination point, an optical axis of the second photodetector is arranged at an angle of $\geq 5°$, preferably $\geq 10°$, particularly preferably $\geq 20°$ to the direction from which the illumination point is illuminated by the optical device, i.e., the direction of illumination. Such an oblique arrangement in particular avoids detecting light reflected by the retina with the detector, which could distort the signal from the second photodetector. Here, an optical axis of the second photodetector corresponds to a detection direction for the light to be detected and is typically perpendicular to a light-sensitive surface of the second photodetector, which is used to detect the light. Due to such an arrangement of the second photodetector, the pupil of the eye appears dark in an image generated on the basis of the signal data of the second photodetector, since the retina is shaded for the second photodetector due to the aperture of the pupil. Illumination light reflected or scattered by the retina cannot reach the second photodetector.

According to a second aspect of the present invention, a method for determining a pupil position of an eye using an optical device is provided, wherein the optical device comprises a laser, a first photodetector, a second photodetector, an adjustable beam deflection device, a control unit for controlling the adjustable beam deflection device and an evaluation unit, and the eye has a pupil and a retina. Preferably, the optical device is an optical device according to the present invention for determining a pupil position as described above. The method according to an example embodiment of the present invention comprises the following steps:

Light is generated by the laser and at least partially guided to the beam deflection device as illumination light via an illumination beam path. In this way, a plurality of illumination points on the eye and an eye environment are illuminated by the illumination light by means of adjusting the beam deflection device by the control unit, wherein the beam deflection device assumes different positions for different illumination points. For a first portion of the illumination points, illumination light is reflected back to the beam deflection device at the retina of the eye (i.e., in the opposite direction to the particular illumination direction). From the beam deflection device, this light may return to the laser via the illumination beam path and into the resonator of the laser. For a second portion of the illumination points, illumination light is scattered on at least one reference marker of the eye environment. Here, a reference marker of the eye environment is any feature of the eye environment (eye feature) that can be identified by evaluating signals from the second photodetector and that is suitable for determining a relative position within the eye environment in relation to a position of this eye feature. A reference marker can be a single area or a larger structure. For example, skin blemishes, eyelids, eyelashes, tear sac or certain areas within these elements can be used as reference markers. Here, it is advantageous if the reference marker used is as static as possible in relation to the rest of the head, i.e., the position of the reference marker is as good an indicator as possible of head position. Advantageously, either non-rotationally symmetrical reference markers can be used and/or, particularly in the case of point-shaped or rotationally symmetrical reference markers, two, three or more reference markers can be used. On the one hand, this has the advantage that any rotations of the optical device and thus the reference marker can also be identified (not just translations). On the other hand, multiple reference markers can also be used to compensate for or minimize errors and inaccuracies with respect to the positions of the individual reference markers.

Furthermore, according to an example embodiment of the present invention, when illuminating at least the first portion of the illumination points, a laser power of the laser can be measured by means of the first photodetector, in order to be able to determine reflections of the illumination light by means of laser feedback interferometry. Alternatively or additionally, illumination light reflected from a boundary surface of the eye or the eye environment is detected by the first photodetector. Signals from the first photodetector are subsequently evaluated by the evaluation unit. Here, the particular position of the beam deflection device is also assigned to the signals, in order to achieve a spatial assignment. However, when illuminating at least the second portion of the illumination points, illumination light scattered on the eye or the eye environment is detected with the second photodetector and the signals from the second photodetector are evaluated by the evaluation unit. Here as well, the signals in each case are assigned to the positions of the beam deflection device. Within the framework of the signal evaluations for different positions of the beam deflection unit, images of the eye and/or the eye environment can be created in particular. Thus, images can be generated both on the basis of the signal data from the first photodetector and on the basis of the signals from the second photodetector if the position of the beam deflection device is known. The position of the beam deflection device for an illumination point can either be derived from the control signals from the control unit that are used to control the beam deflection device. Alternatively or additionally, it is also possible that the beam deflection device provides such information directly, i.e., it can be measured during illumination, for example by means of PSDs (position-sensitive devices) attached to the rear side of mirrors of the beam deflection device in combination with a light source such as a laser diode. Here, the positions of the beam deflection device can be given in any units and in any form.

Finally, according to an example embodiment of the present invention, a position for the at least one reference maker is ascertained by the evaluation unit based on the evaluated signals from the second photodetector. Taking into account this position of the at least one reference marker, the pupil position is determined by the evaluation unit based on the evaluated signals from the second photodetector. Thus, in the simplest case, for example, within the framework of the signal evaluation, an uncorrected pupil position p' can be determined from the signals from the first photodetector, taking into account the positions of the beam deflection device, and a position of a reference marker r can be determined from the signals from the second photodetector, also taking into account the positions of the beam deflection device. The uncorrected pupil position is now displaced by the position of the reference marker, in order to obtain the desired pupil position p, which indicates the position of the pupil in relation to the reference marker: $p=p'-r$. In other words, the pupil position defined in this way is an indication of the position in relation to a fixed point on the head, specifically the reference marker. If the position of the optical device used in relation to the head and thus to the eye environment changes during repeated illumination of the illumination points, i.e., during repeated scanning of the eye and the eye environment, both the uncorrected position p' of the pupil and the position r of the reference marker change, but the vector p remains the same with identical pupil position in relation to the eye environment. Preferably, with more complex implementations of the method according to the present invention, a plurality of reference markers are used or a rotation of the reference marker is also considered in addition to a position of a reference marker. This makes it possible to take into account not only possible displacements between the optical device and the eye environment, but also rotations in relation to one another.

Since information thus exists with respect to both the pupil and the head, an eye movement and/or a gaze vector of the eye, for example, can be calculated (if the relationship between the position of the pupil in relation to the reference marker and the gaze vector is known) within the framework of the method according to the present invention. Within the framework of the present invention, a gaze vector is any vector indicating the direction of gaze that, for example, passes through the center of the pupil and is oriented in a manner pointing away from the eye. An eye movement is any movement of the eye relative to the eye environment. An eye movement typically corresponds to a change in the direction of gaze of the eye. Upon a movement of the eye, the eye in the eye socket is rotated. Thus, the present invention is based on the fusion of two differently generated detector signals, i.e., it is a correlative method: On the one hand, a pupil position is determined from signals from the first photodetector, and on the other hand, a position of a reference marker is determined from signals from the second photodetector. Since both methods use the same illumination beam path and the same beam deflection device, the signals can easily be spatially set in relation to one another, in order to determine a pupil position relative to a reference marker. This also applies if a signal from the first photodetector and a signal from the second photodetector is not recorded simultaneously for all or some of the illumination points.

Taking into account the particular position of the beam deflection device for each detector signal (signal from a photodetector), the detector signals can be spatially set in relation to one another, so that a position can be determined for the pupil of the eye that indicates the relative position of the pupil to a reference marker. Therefore, the position of a reference marker here can serve to define a reference point, in order to enable a pupil position independent of the relative movement to be determined after a translation as a relative movement of the optical device in relation to the head of a user of the optical device. For relative movements that also include rotations, according to an example embodiment of the present invention, it is necessary to also detect rotations of a reference marker or to use a plurality of reference markers, in order to be able to clearly identify the pupil position relative to the reference markers. Within the framework of the evaluation of the signals from the first photodetector, a first image can be generated based on the signals from the first photodetector. The same applies to the signals from the second photodetector: An image can also be generated here. Thus, the evaluated signals comprise such images or are identical to them. In the case of images that have been generated from the signals from the first photodetector and the second photodetector at least partially for the same positions of the beam deflection device (i.e., signals have been recorded for at least some of the illumination points with both the first photodetector and the second photodetector), these can be superimposed accordingly in order to fuse the information from both images. An example of this is the ascertainment of a pupil position and/or a pupil diameter of a pupil while simultaneously taking into account the signals from both the first photodetector and the second photodetector to reduce inaccuracies, for example by superimposing the corresponding images. However, an offsetting of the signals from both photodetectors for one or more illumination points is also possible if images are not generated from the signals.

In a particularly advantageous design of the method according to the present invention, the beam deflection device is adjusted in such a way that the illumination points are arranged along a substantially sinusoidal or meandering or zigzag-shaped illumination pattern. Through this resulting line-by-line scanning of the eye and the eye environment, the creation of an image from the signals from the photodetectors is particularly simple, since it enables dense coverage of the eye and the eye environment by the illumination points while at the same time being uniformly distributed.

Advantageously, the method according to the present invention is used in such a way that signals from the first photodetector are recorded for each defined illumination point. If the illumination points cover the entire eye and a certain region around the eye and the illumination points are repeatedly illuminated using the beam deflection device, the pupil position can be continuously tracked. The signal evaluation required for this is not computationally complex, since, due to its high reflectivity, the retina can be easily identified by a corresponding signal change. A movement of the optical device relative to the head of a user of the optical device is typically slow and occurs infrequently. Thus, the position of the reference markers in relation to the optical device also changes correspondingly slowly or rarely. It is therefore advantageous to detect and evaluate the signals from the second photodetector only at certain time intervals and/or for certain illumination points (for example, after a plurality of full scans, i.e., several complete scans of all defined illumination points) and, based on this, to carry out a (possibly renewed) correction of the uncorrected pupil position ascertained using the signals from the first photodetector.

According to a third aspect, the present invention relates to smart glasses having an optical device according to the present invention for determining a pupil position of an eye. Such glasses are preferably equipped with additional laser light sources such as laser diodes to generate an image for the user of the smart glasses. These can be arranged together with the laser of the device according to the present invention in a laser module. The composition of the image of the smart glasses can also be accomplished via the same optical illumination path, wherein the same beam deflection device can also be used. The present invention enables a particularly robust approach in order to correct slippage of the smart glasses when determining a pupil position, for example within the framework of eye tracking. The optical device according to the present invention or parts thereof, such as the second photodetector, can be integrated and/or arranged in the eyeglass frame, in one of the eyeglass temples, in the nose bridge or in the nose pads in the case of smart glasses according to the present invention. It is also possible that at least some of the components could be integrated into the eyeglass lens of the smart glasses.

According to an example embodiment of the present invention, by evaluating the illumination light reflected at the retina of the eye by means of the first photodetector, the pupil can be recorded directly and easily detected in the detector signal. In contrast to video recordings, for example, no complex image processing methods are required; in the simplest case, simply observing the signal strength is sufficient due to the highly pronounced reflectivity of the retina. Since only light that enters the illumination beam path via the deflection device is detected, the image is particularly robust with respect to interfering light. This is particularly the case when using laser feedback microscopy, since, on the one hand, the light must reach the resonator of the laser in order to be detected and, on the other hand, the light must be coherent in order to cause corresponding interference effects. Thus, by means of this procedure, an extremely simple and energy-efficient determination of an (uncorrected) pupil position is achieved. However, such an approach has the disadvantage that no information is obtained regarding the position of the pupil relative to the eye. The pupil position can be changed either by changing the eye position or by moving the optical device, for example smart glasses, which implements this approach relative to the eye environment. Thus, a gaze vector cannot be calculated so as to be error-free.

It has now been recognized that a method according to the present invention offers a surprisingly simple and elegant way of using a second photodetector arranged at an angle according to the present invention to obtain information regarding the eye environment in such a way that it can be easily fused with the information obtained by the first photodetector, in order to compensate for undesirable relative movements between the optical device and the eye environment. In this connection, it should be noted that the stand-alone use of such a second photodetector would not be expedient, since such an implementation would require computationally complex methods for detecting the pupil.

An approach according to the present invention enables the determination of a pupil position that is robust with respect to interfering light and is at the same time stable with respect to a relative movement of the optical device according to the present invention with respect to the head of the user of the device. This is particularly advantageous when using the present invention in smart glasses, for example, since smart glasses can easily slip, but at the same time stable and error-free eye tracking is often required over a longer period of time. Since the position correction by means of the second photodetector does not have to be effected continuously, but is sufficient if it is carried out at longer intervals, no particularly increased computing effort is required. An important aspect of the present invention is that the same beam deflection device is used for both measurement methods. Thus, the data obtained can be easily set in relation to one another without, for example, having to determine spatial correlations of the data in a complex manner (for example, by identifying matching image features in the images of the first and second photodetectors and subsequent coordinate transformation). On the contrary, a relatively small data set obtained from the signals from the second photodetector is sufficient for the identification of a reference marker in order to reliably identify it and determine its position and, if necessary, its rotation. There is no need to detect and analyze the entire eye and a larger environment of the eye by means of the second photodetector. The present invention thus discloses a particularly robust and at the same time structurally simple approach for determining a pupil position and a gaze vector.

BRIEF DESCRIPTION OF THE DRAWINGS

Embodiments of the present invention are explained in greater detail with reference to the figures and the following description.

DETAILED DESCRIPTION OF EXAMPLE EMBODIMENTS

In the following description of the embodiments of the present invention, identical or similar elements are denoted by the same reference signs, a repeated description of these elements in individual cases being dispensed with. The figures show the subject matter of the present invention only schematically.

Figure 1:
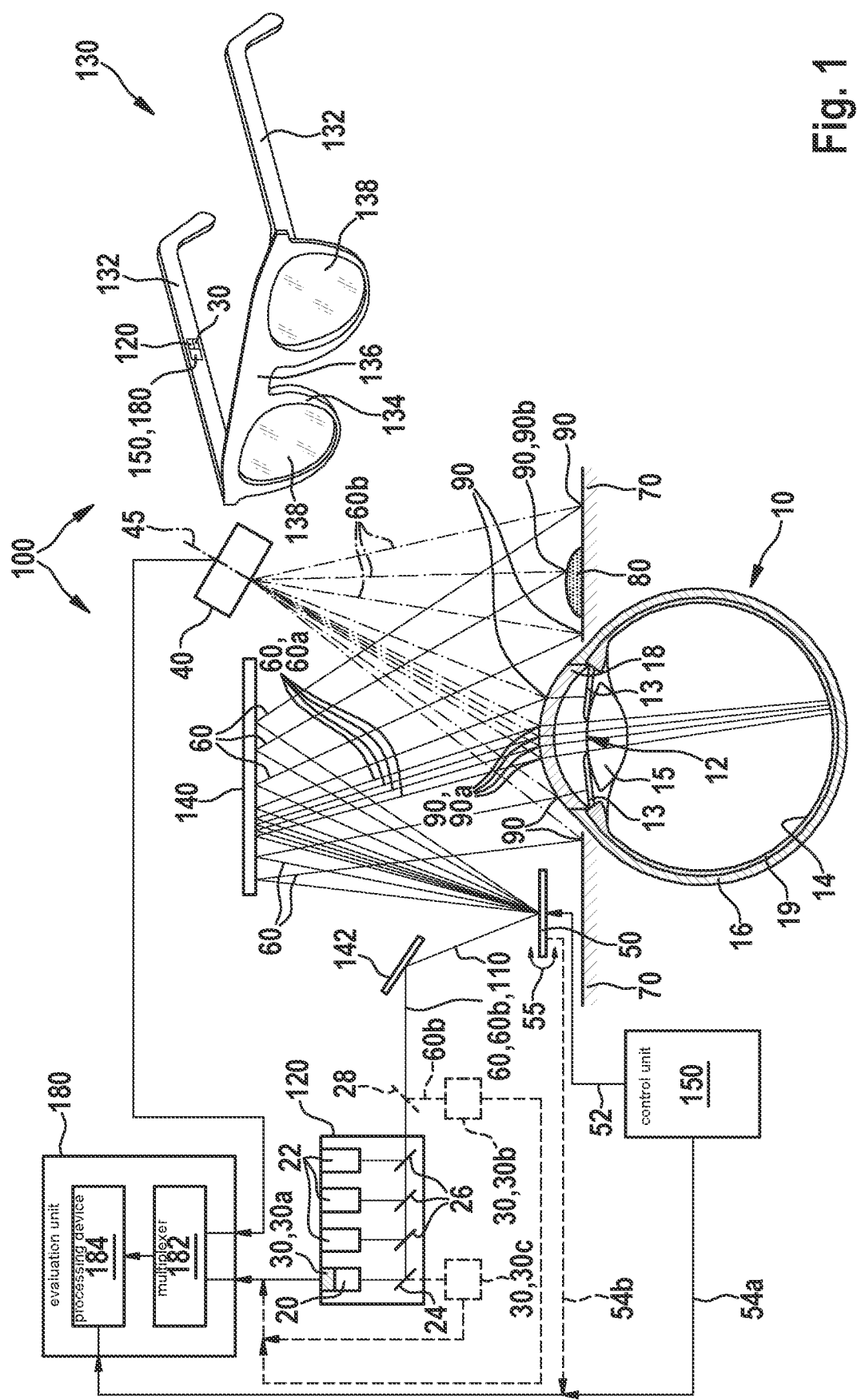
FIG. 1 shows a schematic representation of an optical device according to an example embodiment of the present invention and smart glasses according to an example embodiment of the present invention.

FIG. 1 shows purely schematically an exemplary embodiment of the optical device 100 according to the present invention for determining a pupil position of an eye 10 with a laser 20, which is part of a laser module 120, a first photodetector 30, for example a photodiode, a CMOS sensor and/or a CCD sensor, a second photodetector 40, for example a photodiode, a CMOS sensor and/or a CCD sensor, an adjustable beam deflection device 50 and a control unit 150 for controlling the adjustable beam deflection device 50 along with smart glasses 130 according to the present invention with such an optical device 100. In FIG. 1, components that are alternatives to certain other components shown or can be used in addition to them are represented as dashed lines. Details can be found in the following description of the figures.

Further lasers 22 can be located in the laser module 120 to generate images. The laser 20 can be an infrared laser diode, for example. The light generated by the laser 20 is guided via a mirror 24 through three beam splitters 26 and is then guided via a further mirror 142 via an illumination beam path 110 to the beam deflection device 50. Here, the mirror 142 is also representative of other possible optical elements in the beam path such as mirrors, lenses, filters, prisms, HOEs and so on. The eye 10 shown comprises a sclera 16, a cornea 18, a choroid 19, a lens 12, an iris 13 enclosing a pupil 12, along with a retina 14. The optical device 100 shown can, for example, be installed in smart glasses 130, wherein in the smart glasses 130 shown, parts of the optical device (laser module 120, first photodetector 30, control unit 150 and evaluation unit 180) are placed in one of the eyeglass temples 132. These and other elements such as the beam deflection device 50, the second photodetector 40 and other optical elements 142 can also be integrated into and/or on the eyeglass frame 134, the nose bridge 136, nose pads and/or an eyeglass lens 138, for example.

The light serving as illumination light 60 is directed from the beam deflection device 50 onto the eye 10 and the eye environment 70 by means of an optical element 140. The optical element 140 can be a mirror or an HOE, for example. Purely exemplary beam paths for the simple case of an optical element 140 that works like a planar mirror are shown. Such beam paths are highly simplified and are intended solely to illustrate the principle of the present invention. The optical element 140 can also have a non-planar shape. For example, in the case of a curved HOE as the optical element 140, it is also possible to direct the beams converging onto the eye 10 and the eye environment 70 when the beams are incident at an angle. In particular, it is possible that the optical element 140 is part of a typically curved eyeglass lens 138 or a corrective lens for the smart glasses 130 and/or is embedded in an eyeglass lens 138 or a corrective lens.

The beam deflection device 50 is controlled via a control unit 150; the signals required for this are sent from the control unit 150 to the beam deflection device 50 via the cable 52. In FIG. 1, the beam deflection device 50 is illustrated as a single mirror, but it can comprise a plurality of mirrors. By adjusting the beam deflection device 50 accordingly (indicated by a double arrow 55), a plurality of illumination points 90 can be carried out on the eye 10 and the eye environment 70. In particular, it is possible for the beam deflection device 50 to, for example, perform a complete scanning of the eye 10. In FIG. 1, only one-dimensional scanning is shown for simplicity, but the beam deflection device 50 is advantageously designed so that two-dimensional scanning of an eye 10 and its eye environment 70 can be performed.

If the illumination light 60 strikes an illumination point 90 on the eye 10, it is possible that this is located in such a way (this is the case for the illumination points 90a shown) that parts of the illumination light 60 pass through the cornea 18, the pupil 12 and the eye lens 15 to the retina 14 of the eye 10 and are reflected there again in the direction opposite to the direction of illumination. This illumination light 60a reflected at the retina 14 reaches the illumination beam path 110 at least partially via the optical element 140 and the beam deflection device 50. Information regarding the position of the beam deflection device 50 is transmitted to an evaluation unit 180, which can form a unit with the control unit 150 or be identical thereto. This information can come from the control unit 150 itself (cable connection 54*a*) and correspond to the target values with which the beam deflection device 50 is also controlled. Alternatively or additionally, the positions of the beam deflection device 50 can also be ascertained by measurements (i.e., determination of the actual values) and transferred to the evaluation unit 180 (cable connection 54*b*).

FIG. 1 outlines a plurality of possibilities for drawing conclusions about the intensity of such reflected illumination light 60*a*: The outlined laser 20 can be a laser diode having an integrated monitor diode 30*a*, for example a surface emitter having a longitudinally integrated monitor diode. This monitor diode 30*a* can be used to measure the intensity of the back-reflected illumination light 60*a*, but also to monitor the power of the laser 20, which fluctuates due to interference within the laser 20 caused by the back-reflected light. Alternatively, a beam splitter 28 can also be used to divert parts of the reflected light and direct it to a detector such as a photodetector 30*b*. Power fluctuations of the laser 20 can also be detected with a photodetector 30*c* located outside the laser 20, wherein the element 24 symbolizes a beam splitter in this case: Parts of the light generated by the laser 20 are branched off by this beam splitter 24 and directed onto the photodetector 30*c*. If the illumination light strikes the eye 10 or the eye environment 70 including a reference marker 80 of the eye environment 70, it is typically also partially scattered. The scattered light 60*b* can be detected by a second photodetector 40 (shown in FIG. 1 with an optical axis 45 that is perpendicular to the light-sensitive surface of the second photodetector 40 used for detection), wherein the photodetector 40 sends its signals to an evaluation unit 180. In particular, signals are recorded here for illumination points 90*b* that are arranged on the reference marker 80. Here, the second photodetector 40 is arranged in such a way that, for each illumination point 90, the optical axis 45 of the second photodetector 40 is at an angle of ≥5° to the direction from which the illumination point 90 is illuminated by the optical device. Thus, the angle between the illumination light 60 reflected at the optical element 140 and the optical axis 45 of the second photodetector 40 is ≥5° in all cases. The signals from the first photodetector 30 and the second photodetector 40 reach a multiplexer 182 of an evaluation unit 180. The signal to be evaluated can be selected here and is further processed in the evaluation unit 180. Finally, an image processing device 184, which in the example shown is part of the evaluation unit 180, creates images on the basis of the evaluated signals from the first and second photodetectors 30, 40 and the information with respect to the position of the beam deflection device 50. On the basis of such images, a pupil position relative to the optical device 100 along with a gaze vector can be determined, taking into account the position of the reference marker 80.

Figure 2:
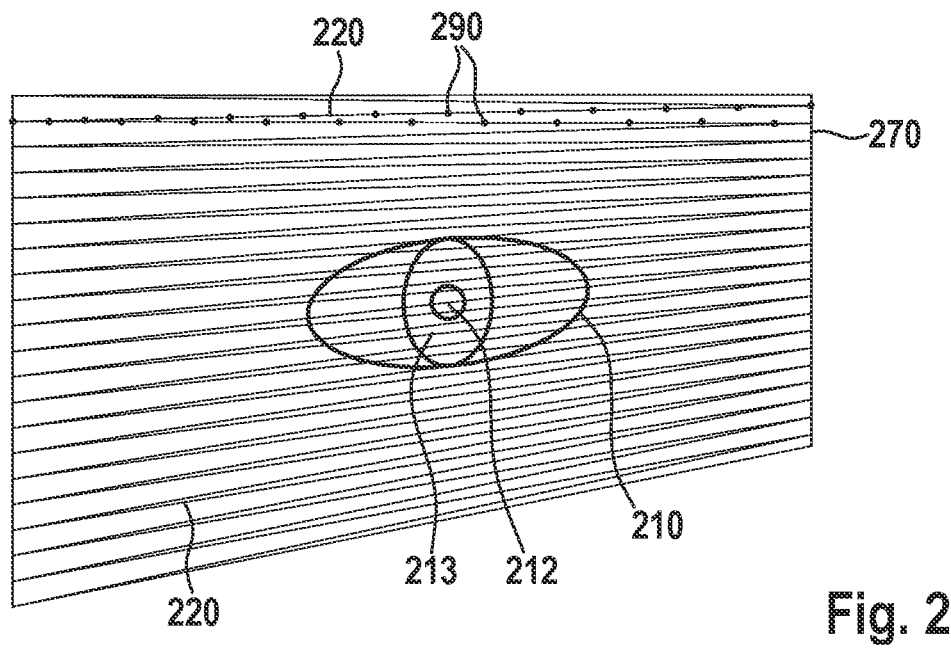
FIG. 2 shows a schematic representation of a possible arrangement of illumination points.

FIG. 2 schematically shows an exemplary way of scanning an eye 210 with an iris 213 and a pupil 212 along with its environment 270. Here, the beam deflection device 50 of an optical device 100 according to the present invention is adjusted in such a way that the illumination light 60 describes a substantially zigzag-shaped illumination pattern 220. The illumination points 290 are located on this path 220, of which only a small part is shown here as an example.

Figure 3:
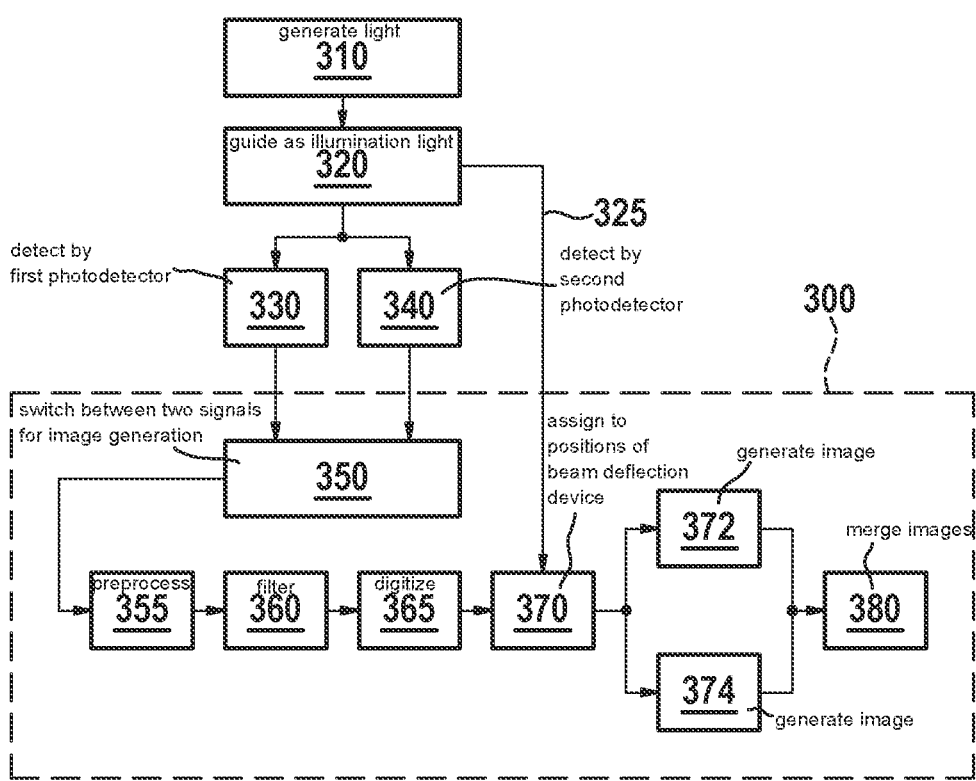
FIG. 3 shows a flow chart of a method according to an example embodiment of the present invention including signal evaluation.

FIG. 3 shows a flow diagram of an exemplary method according to the present invention for determining a pupil position of an eye 10 and illustrates in particular a variant of the signal evaluation. In step 310, light is generated by a laser 20. In step 320, this is guided as illumination light 60 over the eye 10 and the eye environment 70 by means of adjusting a beam deflection device 50. Here, various illumination points 90 on the eye 10 and the eye environment 70 are illuminated. Illumination light 60*a* reflected at the retina 14 is subsequently either directly detected by a first photodetector 30 in step 330 or indirectly measured by means of laser feedback interferometry. Similarly, illumination light 60*b* scattered on the eye 10 or the eye environment 70 is detected by a second photodetector 40 in step 340. The signals from the detectors 30, 40 are now fed to an evaluation unit 300, where they first reach a multiplexer 182, which can be used to switch between the two signals for image generation in step 350. The particular signal is subsequently pre-processed in step 355 via an amplifier, for example a transimpedance amplifier, and in step 360 via a filter, for example a bandpass filter, and finally digitized in step 365 by an ADC (analog-to-digital converter). The amplification factors of the amplifier, the cut-off frequencies of the filter and the settings of the ADC can be adjusted according to the signal characteristics of the particular detector signal, in order to be able to generate the highest possible quality images from the detector signals. The signals are now assigned to the positions of the beam deflection device 50 in step 370, which are also transmitted to the evaluation unit 300 (arrow 325) and an image is generated from this data in step 372 (in the case of a detector signal from the first photodetector 30) or step 374 (in the case of a detector signal from the second photodetector 40) in an image processing device 184. Depending on the detector signal on which the image generated in this way is based, an uncorrected position of the pupil 12 (for image from signal from the first photodetector 30, step 372) or a position of a reference marker 80 (for image from signal from the second photodetector 40, step 374) can be generated from the image, for example. Finally, by merging the information of both images, an eye model can be determined in step 380, which comprises a (corrected) pupil position that indicates a position of the pupil 12 in relation to the reference marker 80, and a gaze vector for the eye 10. Alternatively, both possible signal paths may not be connected by a multiplexer 182 in step 350 as shown in FIG. 3, but may also be implemented separately from one another and only merged in the last step 380.

Figure 4:
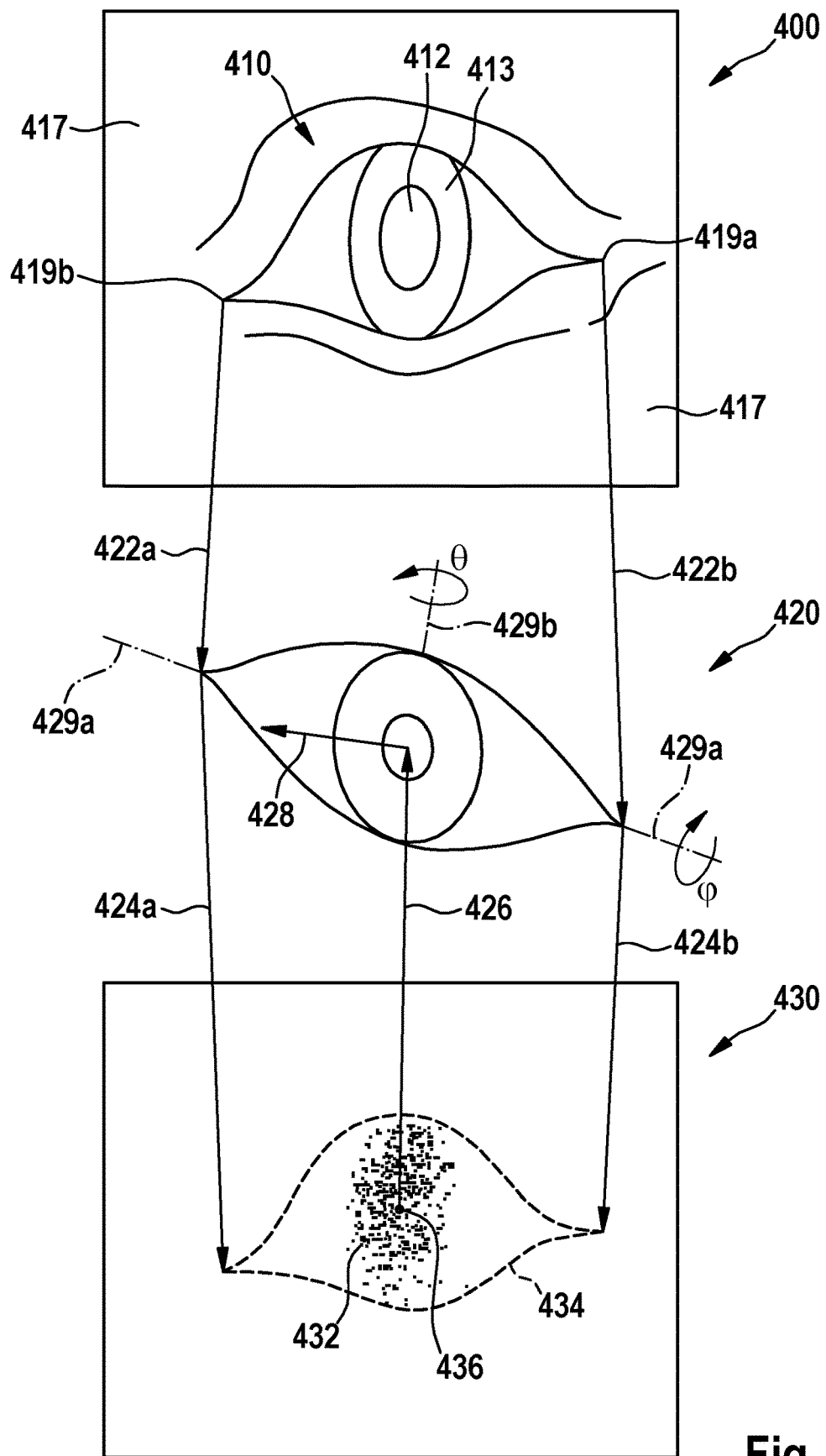
FIG. 4 shows a schematic representation with respect to the determination of a gaze vector using a method according to an example embodiment of the present invention.

Finally, FIG. 4 shows a schematic representation for illustrating a determination of an eye model 420 for an eye 410 and, in particular, a gaze vector 428 using a method according to the present invention. From the detector signals from a first photodetector 30 and a second photodetector 40, images 400 and 430 can be generated together with the knowledge of the associated positions of the beam deflection device 50 used within the framework of the signal evaluation when carrying out a method according to the present invention. Here, the image 430 is based on the signals from the first photodetector 30, which is based on the intensity of light 60*a* reflected at the retina 14. The image 400 is created from signals from the second photodetector 40, which detects light 60*b* scattered from the eye 410 or the eye environment 417. Both images 400, 430 were created on the basis of the same illumination points 90 on the eye 410 and its eye environment 417. Accordingly, the eye 410 is visible in the image 400 with its eye environment 417, the iris 413 and the pupil 412 of the eye 410. Image 430 also shows the pupil 412 of the eye 410, visible in the image 430 as a speckle pattern 432, which is created due to the optical roughness of the retina 14 of the eye 410.

The position of two reference markers 419a, 419b can be identified from image 400, wherein the angles of the eye 410 serve as reference markers in FIG. 4. A pupil position could also be ascertained from the image 400, since pupil 412 is visible here. However, in contrast to image 430, this requires significantly more computing capacity than determining the pupil position from image 430 due to the greater information density.

In the specific case of FIG. 4, both images 400 and 430 have exactly the same size, i.e., are congruent, since both images 400 and 430 are based on the same illumination points 90 in this exemplary embodiment. However, this is not essential for the implementation of the present invention. However, according to the present invention, the illumination points must be illuminated via the same beam deflection device in order to be able to set the illumination points in relation to one another. In FIG. 4, an eye model 420 can be determined from both images 400, 430: For this purpose, the position of the reference markers 419a, 419b is extracted from the image 400 and transferred to the eye model 420 (arrows 422a, 422b). Since both images 400, 430 have the same size, the positions of the reference markers 419a, 419b can also be transferred to image 430 (arrows 424a, 424b). Thus, a pupil position 436 of the pupil 412 from image 430 can be indicated in relation to the two reference markers 419a, 419b and this pupil position 436 can also be transferred to the eye model 420 (arrow 426). For further illustration, a dashed line 434 is drawn in image 430, which schematically represents the shape of the eye 410 from image 400. With knowledge with respect to the position of the reference markers 419a, 419b in relation to the eye 410 (here: position on an axis of rotation 429a of the eye 410) and thus the relationship between the position of the pupil 412 (with respect to the reference markers 419a, 419b) and the gaze vector, a gaze vector 428 can finally be calculated, which can be indicated, for example, with the angles $\theta$, $\varphi$, shown in the figure, which designate the rotation of the eye 410 about two of its axes of rotation 429a, 429b.

The present invention is not limited to the embodiments described here and the aspects emphasized therein. Rather, a large number of modifications are possible within present invention and within the scope of the activities of a person skilled in the art.

The invention claimed is:

1. An optical device for determining a pupil position of an eye, the optical device comprising:
 a laser;
 a first photodetector;
 a second photodetector;
 an adjustable beam deflection device; and
 a control unit configured to control the adjustable beam deflection device;
 wherein the optical device is configured to:
   guide light generated by the laser at least partially as illumination light via an illumination beam path to the beam deflection device, and illuminate a plurality of illumination points on the eye and an eye environment of the eye using the illumination light by adjusting the beam deflection device using the control unit,
   measure, during illumination of at least a first portion of the illumination points using the first photodetector, a laser power of the laser when illuminating the illumination points and detect, using the first photodetector, the illumination light reflected at a boundary surface of the eye or the eye environment and entering the illumination beam path via the beam deflection device, and
   detect, during illumination of at least a second portion of the illumination points, illumination light scattered on the eye or on the eye environment, using the second photodetector.

2. The optical device according to claim 1, wherein: (i) the laser is an infrared laser and/or a laser diode, and/or (ii) the first photodetector and/or the second photodetector is a photodiode, and/or a CMOS sensor and/or a CCD sensor, and/or (iii) the adjustable beam deflection device includes a micromirror actuator and/or a galvanometer scanner and/or a resonant scanner.

3. The optical device according to claim 1, wherein the laser is a surface emitter having an integrated monitor diode, and the first photodetector is a monitor diode of the surface emitter.

4. The optical device according to claim 1, further comprising:
 a further optical element including a mirror and/or a prism and/or an HOE, wherein the further optical element is configured to deflect the illumination light again after it has passed through the beam deflection device.

5. The optical device according to claim 1, further comprising:
 an evaluation unit which is configured to evaluate signals from the first photodetector and signals from the second photodetector and to determine a pupil position and/or a gaze vector from the evaluated signals.

6. The optical device according to claim 5, wherein: (i) the evaluation unit includes a multiplexer, which is used to switch between the signals from the first photodetector and the signals from the second photodetector for evaluating the signals, and/or (ii) the evaluation unit includes an image processing device, which is configured to generate a first image from the evaluated signals from the first photodetector and a second image from the signals from the second photodetector.

7. The optical device according to claim 1, wherein: (i) the first photodetector is arranged such that a portion of the light generated by the laser is detected by the first photodetector, and/or (ii) the second photodetector is arranged such that, for each illumination point, an optical axis of the second photodetector is arranged at an angle of $\geq 5$ to a direction from which the illumination point is illuminated by the optical device.

8. A method for determining a pupil position of an eye using an optical device, wherein the optical device includes a laser, a first photodetector, a second photodetector, an adjustable beam deflection device, a control unit configured to control the adjustable beam deflection device, and an evaluation unit, and the eye has a pupil and a retina, the method comprising the following steps:
 a) generating light by the laser and at least partially guiding the light as illumination light via an illumination beam path to the beam deflection device;
 b) illuminating a plurality of illumination points on the eye and an eye environment of the eye by the illumination light by adjusting the beam deflection device using the control unit, wherein the beam deflection device assumes different positions for different illumination points, and, for a first portion of the illumination points, the illumination light is reflected back to the beam deflection device at the retina of the eye, and, for a second portion of the illumination points, the illumination light is scattered on at least one reference marker of the eye environment;

c) when illuminating at least the first portion of the illumination points: (i) measuring a laser power of the laser using the first photodetector, and (ii) detecting illumination light reflected at a boundary surface of the eye or the eye environment with the first photodetector, and evaluating signals from the first photodetector by the evaluation unit, including an assignment of the signals to a position of the beam deflection device;

d) when illuminating at least the second portion of the illumination points, detecting illumination light scattered on the eye or at the eye environment with the second photodetector and evaluating signals from the second photodetector by the evaluation unit, including an assignment of the signals to a position of the beam deflection device;

e) determining a position of the at least one reference marker based on the evaluated signals from the second photodetector by the evaluation unit; and f) determining, taking into account the position of the at least one reference marker, the pupil position based on the evaluated signals from the first photodetector by the evaluation unit.

9. The method according to claim 8, wherein the evaluation of the signals from the first photodetector includes generation of a first image based on the signals from the first photodetector and/or the evaluation of the signals from the second photodetector includes generation of a second image based on the signals from the second photodetector, and/or both step c) and step d) are carried out for at least some of the illumination points.

10. The method according to claim 8, wherein the beam deflection device is adjusted in such a way that the illumination points are arranged along a sinusoidal or meandering or zigzag-shaped illumination pattern.

11. The method according to claim 8, further comprising calculating a gaze vector of the eye and/or an eye movement of the eye.

12. Smart glasses, comprising:
an optical device for determining a pupil position of an eye, the optical device including:
a laser,
a first photodetector,
a second photodetector,
an adjustable beam deflection device, and
a control unit configured to control the adjustable beam deflection device,
wherein the optical device is configured to:
guide light generated by the laser at least partially as illumination light via an illumination beam path to the beam deflection device, and illuminate a plurality of illumination points on the eye and an eye environment of the eye using the illumination light by adjusting the beam deflection device using the control unit,
measure, during illumination of at least a first portion of the illumination points using the first photodetector, a laser power of the laser when illuminating the illumination points and detect, using the first photodetector, the illumination light reflected at a boundary surface of the eye or the eye environment and entering the illumination beam path via the beam deflection device, and
detect, during illumination of at least a second portion of the illumination points, illumination light scattered on the eye or on the eye environment, using the second photodetector.

* * * * *